(12) United States Patent
Davis et al.

(10) Patent No.: US 12,162,321 B2
(45) Date of Patent: *Dec. 10, 2024

(54) DRIVEN LIFT AXLES AND ASSOCIATED SYSTEMS AND METHODS

(71) Applicant: Link Mfg., Ltd., Sioux Center, IA (US)

(72) Inventors: Tye B. Davis, Grand Meadow, MN (US); Craig Jungjohan, Spirit Lake, IA (US)

(73) Assignee: Link Mfg., Ltd., Sioux Center, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/487,980

(22) Filed: Oct. 16, 2023

(65) Prior Publication Data

US 2024/0140159 A1 May 2, 2024

Related U.S. Application Data

(63) Continuation of application No. 17/861,115, filed on Jul. 8, 2022, now Pat. No. 11,820,188.

(Continued)

(51) Int. Cl.
*B60G 9/00* (2006.01)
*B60G 17/015* (2006.01)
(Continued)

(52) U.S. Cl.
CPC .......... *B60G 17/0155* (2013.01); *B60G 9/00* (2013.01); *B60K 1/02* (2013.01); *B60K 17/16* (2013.01); *B60G 17/052* (2013.01)

(58) Field of Classification Search
CPC .... B60G 17/0155; B60G 9/00; B60G 17/052; B60K 1/02; B60K 17/16
See application file for complete search history.

(56) References Cited

U.S. PATENT DOCUMENTS 2,226,047 A 12/1940 Carl
3,025,076 A 3/1962 John et al.
(Continued)

FOREIGN PATENT DOCUMENTS

BR 102018013922 A2 2/2020
CN 106183684 A 12/2016
(Continued)

OTHER PUBLICATIONS

Tuthill Transport Technologies advertisement for Model 345P Super Duty Air Suspension, 1999.
(Continued)

*Primary Examiner* — Toan C To
(74) *Attorney, Agent, or Firm* — Perkins Coie LLP

(57) ABSTRACT

Driven lift axles and associated systems and components are provided for use on heavy duty trucks, trailers, and/or other vehicles. Driven lift axle systems may include one or more motors mounted to the lift axle to provide torque to drive one or more wheels of the lift axle. Various mounting configurations of such motors are possible, such as arranging a motor on the axle to provide torque at a conventional driveshaft input by interfacing with a differential drive gear, positioning a motor at each of the wheel ends of the axle to provide torque directly to the wheels, etc. Each wheel can be driven by a separate motor, allowing for independent control of the torque applied to each wheel. Lift axles described herein can be suitable for use with various motors capable of applying torque to the axle and/or wheels, such as electric motors, hydraulic motors, internal combustion engines, etc.

20 Claims, 8 Drawing Sheets

Related U.S. Application Data

(60) Provisional application No. 63/219,770, filed on Jul. 8, 2021.

(51) Int. Cl.
  *B60K 1/02* (2006.01)
  *B60K 17/16* (2006.01)
  *B60G 17/052* (2006.01)

(56) References Cited

U.S. PATENT DOCUMENTS

| | | |
|---|---|---|
| 3,116,071 A | 12/1963 | Karl et al. |
| 3,246,716 A | 4/1966 | Kozicki |
| 3,315,981 A | 4/1967 | Behles |
| 3,575,441 A | 4/1971 | Arning et al. |
| 3,630,541 A | 12/1971 | Carlson et al. |
| 3,653,683 A | 4/1972 | Hendrickson |
| 3,730,548 A | 5/1973 | Thaxton |
| 3,733,087 A | 5/1973 | Allison |
| 3,850,445 A | 11/1974 | Borns et al. |
| 3,895,818 A | 7/1975 | Fearon |
| 3,992,036 A | 11/1976 | Allison |
| 4,072,322 A | 2/1978 | Fuchs et al. |
| 4,146,249 A | 3/1979 | Paul |
| 4,267,896 A | 5/1981 | Hendriksen |
| 4,350,358 A * | 9/1982 | Ferris .................. B60P 3/16 |
| | | 180/24.01 |
| 4,382,604 A | 5/1983 | Nakagawa |
| 4,390,187 A | 6/1983 | Maeda |
| 4,415,179 A | 11/1983 | Marinelli |
| 4,458,915 A | 7/1984 | Emery |
| 4,518,171 A | 5/1985 | Hedenberg |
| 4,736,964 A | 4/1988 | Specktor |
| 4,756,550 A | 7/1988 | Raidel |
| 4,759,567 A | 7/1988 | Allen |
| 4,792,148 A | 12/1988 | Hintz |
| 4,802,690 A | 2/1989 | Raidel |
| 4,809,960 A | 3/1989 | Kakimoto et al. |
| 4,856,814 A | 8/1989 | Jones |
| 4,869,527 A | 9/1989 | Coddens |
| 4,900,057 A | 2/1990 | Raidel |
| 4,934,667 A | 6/1990 | Pees et al. |
| 5,018,756 A | 5/1991 | Mitchell |
| 5,029,885 A | 7/1991 | Steiner |
| 5,058,867 A | 10/1991 | Hadano et al. |
| 5,083,812 A | 1/1992 | Wallace et al. |
| 5,163,699 A | 11/1992 | Specktor |
| 5,230,528 A | 7/1993 | Van Raden et al. |
| 5,251,926 A | 10/1993 | Aulerich et al. |
| 5,265,907 A | 11/1993 | Tostado |
| 5,301,977 A | 4/1994 | Schlosser et al. |
| 5,328,160 A | 7/1994 | Mclaughlin |
| 5,362,093 A | 11/1994 | Klosterhuber et al. |
| 5,368,326 A | 11/1994 | Turck et al. |
| 5,398,411 A | 3/1995 | Kusaka et al. |
| 5,403,031 A | 4/1995 | Gottschalk et al. |
| 5,452,919 A | 9/1995 | Hoyle et al. |
| 5,505,481 A | 4/1996 | Vandenberg et al. |
| 5,505,482 A | 4/1996 | Vandenberg |
| 5,509,684 A | 4/1996 | Yarrow et al. |
| 5,579,860 A | 12/1996 | Halverson et al. |
| 5,678,845 A | 10/1997 | Stuart |
| 5,692,767 A | 12/1997 | Kato |
| 5,785,345 A | 7/1998 | Barlas et al. |
| 5,820,156 A | 10/1998 | Vandenberg |
| 5,882,031 A | 3/1999 | Vandenberg |
| 5,924,712 A | 7/1999 | Pierce |
| 5,944,339 A | 8/1999 | Mckenzie et al. |
| 5,988,672 A | 11/1999 | Vandenberg |
| 6,073,946 A | 6/2000 | Richardson |
| 6,073,947 A | 6/2000 | Gottschalk et al. |
| 6,131,930 A | 10/2000 | Chalin |
| 6,135,470 A | 10/2000 | Dudding |
| 6,158,750 A | 12/2000 | Gideon et al. |
| 6,311,993 B1 * | 11/2001 | Hulstein .............. B62D 61/125 |
| | | 280/86.75 |
| 6,312,006 B1 * | 11/2001 | Svensson ............. B60G 11/27 |
| | | 280/124.128 |
| 6,328,322 B1 * | 12/2001 | Pierce .................... B60G 7/001 |
| | | 280/124.167 |
| 6,367,826 B1 | 4/2002 | Klais |
| 6,398,236 B1 | 6/2002 | Richardson |
| 6,416,069 B1 * | 7/2002 | Ramsey ................ B60G 11/27 |
| | | 280/124.128 |
| 6,502,837 B1 | 1/2003 | Hamilton et al. |
| 6,527,286 B2 | 3/2003 | Keeler et al. |
| 6,607,205 B2 | 8/2003 | Platner |
| 6,622,996 B2 | 9/2003 | Mayerboeck et al. |
| 6,659,479 B1 | 12/2003 | Raidel et al. |
| 6,758,648 B1 | 7/2004 | Eekhoff et al. |
| 6,808,035 B1 | 10/2004 | Keeler |
| 6,808,192 B1 | 10/2004 | Bol |
| 6,832,143 B2 | 12/2004 | Trudeau et al. |
| 6,834,873 B1 | 12/2004 | Vander et al. |
| 6,845,989 B2 | 1/2005 | Fulton et al. |
| 6,851,687 B2 | 2/2005 | Klais |
| 6,851,689 B2 | 2/2005 | Dudding et al. |
| 6,859,989 B2 | 3/2005 | Bauer et al. |
| 6,871,864 B2 | 3/2005 | Reineck |
| 6,880,839 B2 | 4/2005 | Keeler et al. |
| 6,886,266 B2 | 5/2005 | Kidd et al. |
| 6,886,840 B2 | 5/2005 | Reineck |
| 6,932,401 B1 | 8/2005 | Eekhoff et al. |
| 6,945,548 B2 | 9/2005 | Dudding et al. |
| 7,014,237 B1 | 3/2006 | Eekhoff et al. |
| 7,083,176 B2 | 8/2006 | Soles et al. |
| 7,182,354 B2 | 2/2007 | Dudding |
| 7,216,925 B1 | 5/2007 | Abele et al. |
| 7,234,713 B1 | 6/2007 | Vander et al. |
| 7,261,304 B2 | 8/2007 | Trudeau et al. |
| 7,281,721 B2 | 10/2007 | Hudson et al. |
| 7,293,781 B2 | 11/2007 | Power et al. |
| 7,296,809 B2 | 11/2007 | Zebolsky |
| 7,303,200 B2 | 12/2007 | Ramsey |
| 7,331,588 B2 | 2/2008 | Johnson |
| 7,331,627 B2 | 2/2008 | Van Den Brink et al. |
| 7,389,994 B2 | 6/2008 | Trudeau et al. |
| 7,392,996 B2 | 7/2008 | Mattocks |
| 7,416,190 B2 | 8/2008 | Sandbulte et al. |
| 7,464,948 B2 | 12/2008 | Ramsey |
| 7,481,441 B2 | 1/2009 | Kirkham |
| 7,503,414 B2 | 3/2009 | Pierce et al. |
| 7,503,586 B2 | 3/2009 | Ramsey |
| 7,530,577 B2 | 5/2009 | Sandbulte et al. |
| 7,549,660 B2 | 6/2009 | Ramsey et al. |
| 7,568,710 B2 | 8/2009 | Ramsey |
| 7,600,785 B2 | 10/2009 | Ramsey |
| 7,607,670 B2 | 10/2009 | Raidel et al. |
| 7,658,412 B2 | 2/2010 | Ramsey et al. |
| 7,661,916 B2 | 2/2010 | Downey |
| 7,690,660 B2 | 4/2010 | Dudding et al. |
| 7,731,211 B2 | 6/2010 | Ramsey |
| 7,735,516 B2 | 6/2010 | Morris |
| 7,766,352 B2 | 8/2010 | Keeler |
| 7,789,405 B2 | 9/2010 | Lie |
| 7,887,065 B2 | 2/2011 | Trudeau et al. |
| 7,891,679 B2 | 2/2011 | Svartz et al. |
| 7,966,685 B2 | 6/2011 | Van Beek et al. |
| 8,177,246 B2 | 5/2012 | Cortez et al. |
| 8,192,106 B2 | 6/2012 | Vogler et al. |
| 8,302,988 B2 | 11/2012 | Noble |
| 8,371,596 B2 | 2/2013 | Johnson et al. |
| 8,403,346 B2 | 3/2013 | Chalin et al. |
| 8,413,997 B1 | 4/2013 | Coombs et al. |
| 8,459,400 B2 | 6/2013 | Dillard |
| 8,496,259 B2 | 7/2013 | Ramsey |
| 8,523,207 B2 | 9/2013 | Dodd |
| 8,523,208 B2 | 9/2013 | Rezania et al. |
| 8,573,611 B1 | 11/2013 | Jensen |
| 8,590,912 B2 | 11/2013 | Mccarthy et al. |
| 8,622,406 B2 | 1/2014 | Eveley |
| 8,641,062 B2 | 2/2014 | Gottschalk |
| 8,967,638 B2 | 3/2015 | Gottschalk |

(56) References Cited

U.S. PATENT DOCUMENTS

| | | | |
|---|---|---|---|
| 8,979,105 B2 | 3/2015 | Mccarthy et al. | |
| D727,219 S | 4/2015 | Winter et al. | |
| 9,139,061 B2 | 9/2015 | Delorenzis | |
| 9,157,529 B2 | 10/2015 | Westnedge et al. | |
| 9,233,589 B1 | 1/2016 | Miller | |
| 9,290,221 B2 | 3/2016 | Conaway et al. | |
| 9,315,083 B2 | 4/2016 | Noble et al. | |
| 9,315,222 B1 | 4/2016 | Wetter et al. | |
| 9,340,242 B1 | 5/2016 | Hartmann et al. | |
| 9,352,628 B2* | 5/2016 | Barton | B62D 61/12 |
| 9,358,854 B1 | 6/2016 | Sandbulte et al. | |
| 9,422,014 B1* | 8/2016 | Schuck | B60G 5/00 |
| 9,481,416 B2 | 11/2016 | Conaway et al. | |
| 9,688,318 B1 | 6/2017 | Wetter et al. | |
| 9,707,999 B2 | 7/2017 | Spielmann | |
| 9,829,060 B2 | 11/2017 | Batsch et al. | |
| 9,937,766 B1 | 4/2018 | Bobb et al. | |
| 10,538,135 B2* | 1/2020 | Hemmler | B60G 9/022 |
| 10,543,730 B2 | 1/2020 | Davis et al. | |
| 10,569,813 B2 | 2/2020 | Davis et al. | |
| 10,569,814 B2 | 2/2020 | Hulstein et al. | |
| D897,911 S | 10/2020 | Winter et al. | |
| D897,912 S | 10/2020 | Winter et al. | |
| 10,967,927 B2 | 4/2021 | Jacobsma et al. | |
| 11,225,287 B1* | 1/2022 | Schuck | B62D 21/11 |
| 11,338,865 B2 | 5/2022 | Davis et al. | |
| 11,370,498 B1* | 6/2022 | Herman | B62D 53/061 |
| 11,485,435 B2 | 11/2022 | Jacobsma et al. | |
| 11,712,938 B1* | 8/2023 | Klein | B60G 9/00 |
| | | | 280/86.5 |
| 11,820,188 B2* | 11/2023 | Davis | B60G 9/022 |
| 2001/0007419 A1 | 7/2001 | Tanaka | |
| 2001/0013691 A1* | 8/2001 | Hosoya | B60G 5/03 |
| | | | 280/124.1 |
| 2001/0052685 A1 | 12/2001 | Svartz et al. | |
| 2002/0180173 A1 | 12/2002 | Daily et al. | |
| 2003/0057722 A1 | 3/2003 | Bovio et al. | |
| 2003/0111810 A1 | 6/2003 | Fulton et al. | |
| 2003/0151222 A1 | 8/2003 | Sutton et al. | |
| 2003/0193149 A1 | 10/2003 | Russell et al. | |
| 2003/0214118 A1 | 11/2003 | Pavuk | |
| 2004/0007844 A1 | 1/2004 | Reineck | |
| 2004/0056446 A1 | 3/2004 | Dudding et al. | |
| 2004/0084866 A1* | 5/2004 | Ramsey | B62D 13/04 |
| | | | 280/124.128 |
| 2004/0178594 A1 | 9/2004 | Keeler et al. | |
| 2004/0188973 A1 | 9/2004 | Molitor | |
| 2004/0256820 A1 | 12/2004 | Chalin et al. | |
| 2005/0001397 A1 | 1/2005 | Genick | |
| 2005/0146110 A1 | 7/2005 | Dudding | |
| 2005/0156398 A1 | 7/2005 | Ramsey | |
| 2005/0161896 A1 | 7/2005 | Reineck | |
| 2006/0001311 A1 | 1/2006 | Platner et al. | |
| 2006/0157309 A1 | 7/2006 | Chalin et al. | |
| 2006/0181043 A1 | 8/2006 | Zebolsky | |
| 2007/0126263 A1 | 6/2007 | Ramsey et al. | |
| 2008/0012261 A1 | 1/2008 | Ramsey | |
| 2008/0084047 A1 | 4/2008 | Bluff et al. | |
| 2008/0184623 A1 | 8/2008 | Heigl et al. | |
| 2008/0185549 A1 | 8/2008 | Steinbuchel et al. | |
| 2009/0200718 A1 | 8/2009 | Roemer et al. | |
| 2009/0206570 A1 | 8/2009 | Strong | |
| 2010/0154449 A1* | 6/2010 | Stover, Jr. | B60H 1/3232 |
| | | | 62/323.3 |
| 2010/0253032 A1 | 10/2010 | Ramsey | |
| 2010/0283581 A1 | 11/2010 | Heigl | |
| 2011/0035104 A1 | 2/2011 | Smith | |
| 2012/0284973 A1 | 11/2012 | Glaser et al. | |
| 2013/0062852 A1 | 3/2013 | Dodd | |
| 2013/0087984 A1 | 4/2013 | Gottschalk | |
| 2013/0154225 A1 | 6/2013 | Johnson et al. | |
| 2014/0125029 A1 | 5/2014 | Vandenberg et al. | |
| 2015/0137463 A1 | 5/2015 | Mclennan et al. | |
| 2015/0266375 A1* | 9/2015 | Tavvala | B60K 17/36 |
| | | | 180/24.09 |
| 2015/0273972 A1 | 10/2015 | Plath | |
| 2015/0336436 A1 | 11/2015 | Barton et al. | |
| 2016/0046163 A1 | 2/2016 | Layne et al. | |
| 2016/0152106 A1 | 6/2016 | Preijert | |
| 2016/0272025 A1 | 9/2016 | McComsey et al. | |
| 2017/0016757 A1 | 1/2017 | Strong et al. | |
| 2017/0225729 A1 | 8/2017 | Yakimishyn | |
| 2018/0015815 A1 | 1/2018 | Makino et al. | |
| 2018/0222274 A1* | 8/2018 | Davis | B60G 17/056 |
| 2018/0319451 A1* | 11/2018 | Smith | B60G 17/0155 |
| 2019/0054816 A1 | 2/2019 | Garcia et al. | |
| 2019/0061847 A1 | 2/2019 | Barton et al. | |
| 2019/0077468 A1 | 3/2019 | Hulstein et al. | |
| 2019/0092407 A1* | 3/2019 | Jacobsma | B60G 11/28 |
| 2020/0398628 A1* | 12/2020 | Schardt | B60G 17/017 |

FOREIGN PATENT DOCUMENTS

| | | |
|---|---|---|
| CN | 108891218 A | 11/2018 |
| CN | 209649983 U | 11/2019 |
| CN | 210478326 U | 5/2020 |
| CN | 210478327 U | 5/2020 |
| CN | 112848827 A | 5/2021 |
| CN | 217099591 U | 8/2022 |
| DE | 102011001431 A1 | 9/2012 |
| DE | 102013003300 A1 | 8/2014 |
| EP | 0867315 B1 | 2/2007 |
| EP | 2385269 A2 | 11/2011 |
| EP | 1957344 B1 | 12/2012 |
| JP | 3374503 B2 | 2/2003 |
| JP | 3196517 U | 2/2015 |
| WO | 2006071172 A1 | 7/2006 |
| WO | 2006093458 A1 | 9/2006 |
| WO | 2010132692 A1 | 11/2010 |
| WO | 2020047028 A1 | 3/2020 |
| WO | 2022108444 A1 | 5/2022 |

OTHER PUBLICATIONS

Ridewell Suspensions advertisement for Model RAD-227WB suspension, 2001.
Link Manufacturing Ltd., Air Control Kit (1350-1004), Installation Instructions Parts List; Jan. 14, 2016, 4 pages.
European Patent Office, Partial European Search Report for European Patent Application No. 18195895.0 dated Mar. 20, 2019, 18 pages.
European Patent Office, Extended European Search Report for European Patent Application No. 18195895.0, mailed Aug. 1, 2019, 22 pages.
European Patent Office, Communication pursuant to Article 94(3) EPC, Examination Report, mailed Apr. 7, 2021 for European Patent Application No. 18195895.0, 4 pages.
European Patent Office, Communication pursuant to Article 94(3) EPC, Examination Report mailed Apr. 5, 2022 for European Patent Application No. 18195895.0 filed Sep. 21, 2018, 5 pages.
European Patent Office, Communication pursuant to Article 94(3) EPC, Examination Report mailed Aug. 22, 2022 for European Patent Application No. 18195895.0 filed Sep. 21, 2018, 5 pages.
European Patent Office, Communication pursuant to Article 94(3) EPC, Examination Report, mailed Apr. 21, 2020 for European Patent Application No. 18195895.0, 9 pages.

* cited by examiner

DRIVEN LIFT AXLES AND ASSOCIATED SYSTEMS AND METHODS

CROSS-REFERENCE TO RELATED APPLICATION(S) INCORPORATED BY REFERENCE

The present application is a continuation of U.S. patent application Ser. No. 17/861,115 filed on Jul. 8, 2022, now allowed, which claims the benefit of and priority to U.S. Provisional Patent Application No. 63/219,770 filed on Jul. 8, 2021, and titled "DRIVEN LIFT AXLES AND ASSOCIATED SYSTEMS AND METHODS", the disclosures of which are incorporated herein by reference in their entireties.

TECHNICAL FIELD

The present disclosure is directed generally to driven lift axles and, more particularly, to lift axles having integrated power systems.

BACKGROUND

Many trucks carry loads that vary greatly due to the loading and unloading of cargo. To carry heavy loads, some of these trucks use one or more non-drive rear axles in conjunction with one or more drive axles. The auxiliary non-drive rear axles may be needed for a variety of reasons, including compliance with bridge laws, truck suspension and tire ratings, etc. In certain loading conditions or while the vehicle is unloaded, the non-drive axles are not needed to carry any load, and instead can negatively impact fuel economy and experience unnecessary wear. For this reason, many of these trucks utilize non-drive axles that can be lifted off of the ground and into to a stored position (the "lifted position" or "raised position") when not needed. These axles are generally referred to as lift axles or liftable axles. By raising the lift axle when the vehicle is lightly loaded, wear on the lift axle tires can be reduced and fuel economy can be increased due to the absence of rolling resistance from the lift axle tires and bearing system.

Lift axles can be installed ahead of or behind the drive axles on a straight truck or a tractor. If a lift axle is positioned ahead of the drive axle, the lift axle is referred to as a "pusher." If the lift axle is positioned behind the drive axle, it is referred to as a "tag." There are both steerable and non-steerable lift axles. As the name implies, the wheels on non-steerable lift axles cannot turn, and as a result, non-steerable lift axles can be raised prior to turning a tight corner depending on the proximity of the non-steerable lift axle to the center of turning, to prevent rapid tire wear due to scuff and the imposition of high lateral stresses on the wheels and other chassis components. Steerable lift axles, also referred to as "self-steer" axles, include wheels that caster in response to the vehicle turning so they can remain in contact with the ground when the axle is located further away from the center of turning.

A typical over-the-road truck specification is a "6×4" or "six-by-four" configuration, with 6 total wheel positions: one front axle having two wheel positions, and two rear axles each having two wheel positions. In the 6×4 configuration, four of the six wheel positions (typically the wheels on the rear axles) are powered by the engine through the transmission and driveshaft(s). In a 6×2 configuration, only one of the two rear axles is powered, such that only two of the six wheel positions are driven. For certain use cases, a 6×2 configuration can provide advantages over a 6×4 configurations in fuel economy, cost, complexity, etc. In some instances, the non-driven rear axle in a 6×2 configuration can be a lift axle that can be raised to reduce tire wear and increase fuel economy. However, the tractive performance of a 6×2 configuration is typically reduced from the tractive performance of a 6×4 configuration since only a single axle is driven.

Various lift axle systems are described in U.S. Pat. No. 5,403,031 to Gottschalk et al., U.S. Pat. No. 6,311,993 to Hulstein et al., U.S. Pat. No. 6,880,839 to Keeler et al., and U.S. Pat. No. 9,352,628 to Barton et al., each of which is incorporated herein by reference in their entirety.

DETAILED DESCRIPTION

Figure 1A:
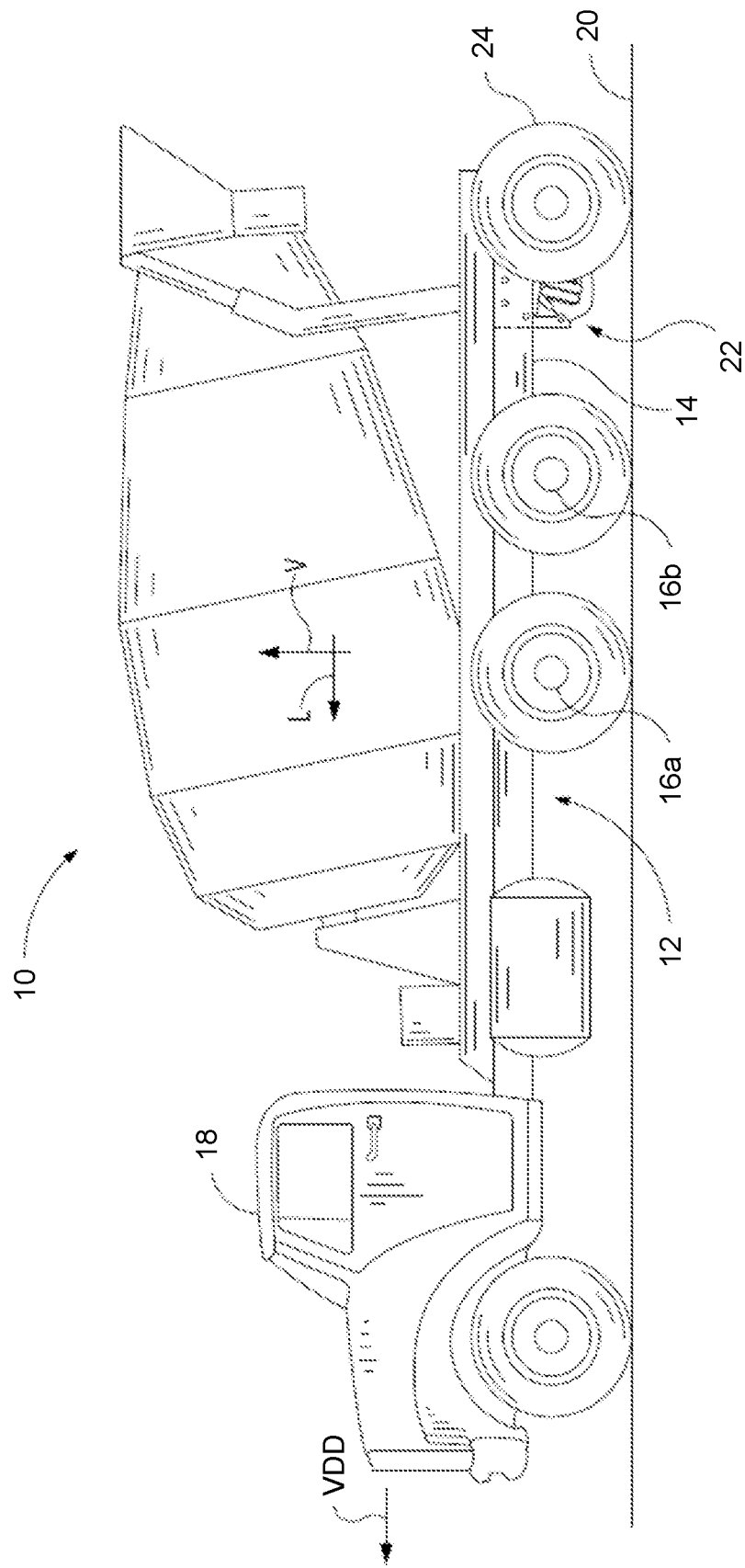
FIG. 1A is a side view of a vehicle having a lift axle system configured in accordance with embodiments of the present technology.
Figure 1B:
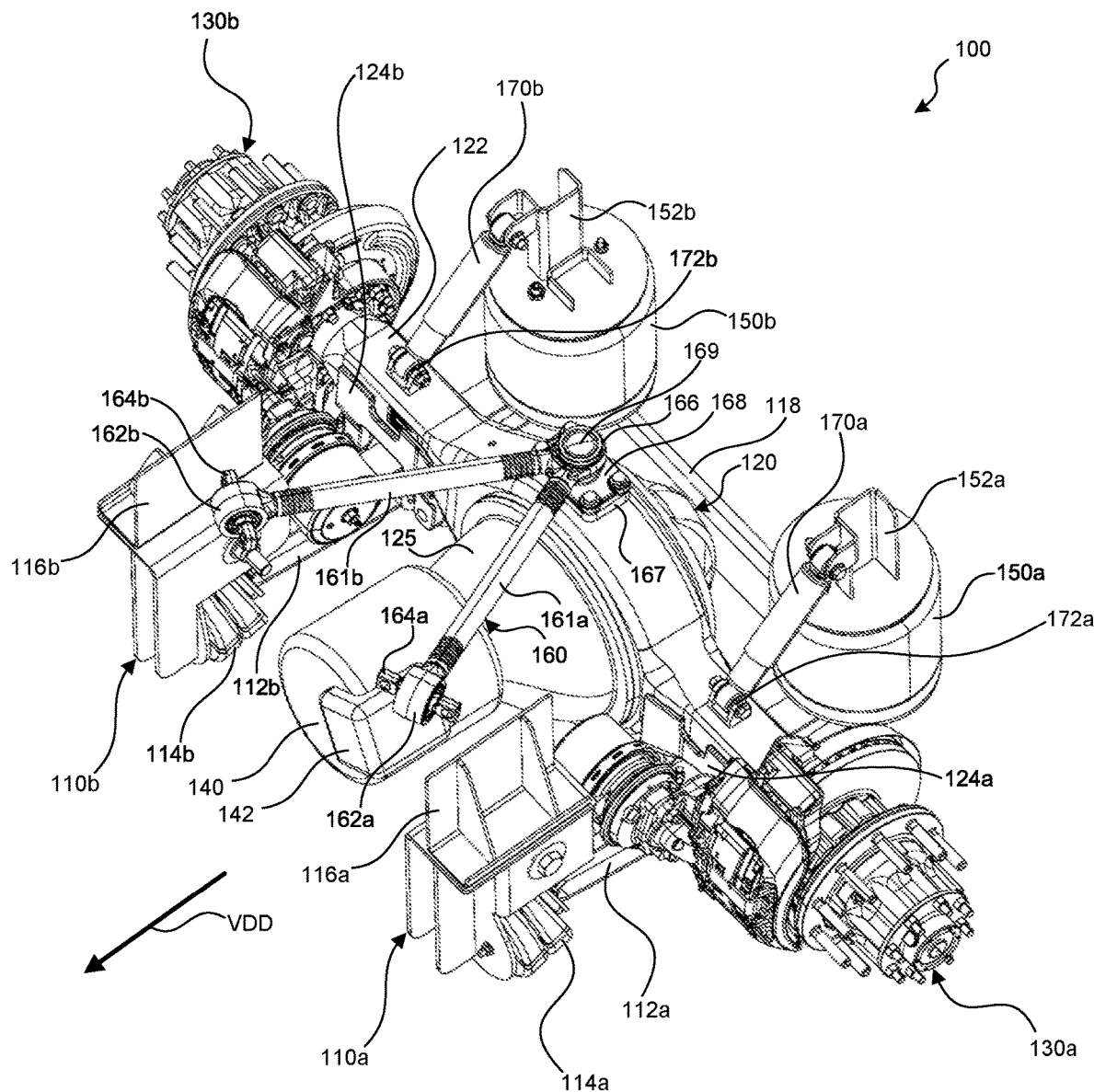
FIGS. 1B-1E are perspective, top plan, right side, and exploded perspective views, respectively, of a driven lift axle system configured in accordance with embodiments of the present technology.
Figure 1C:
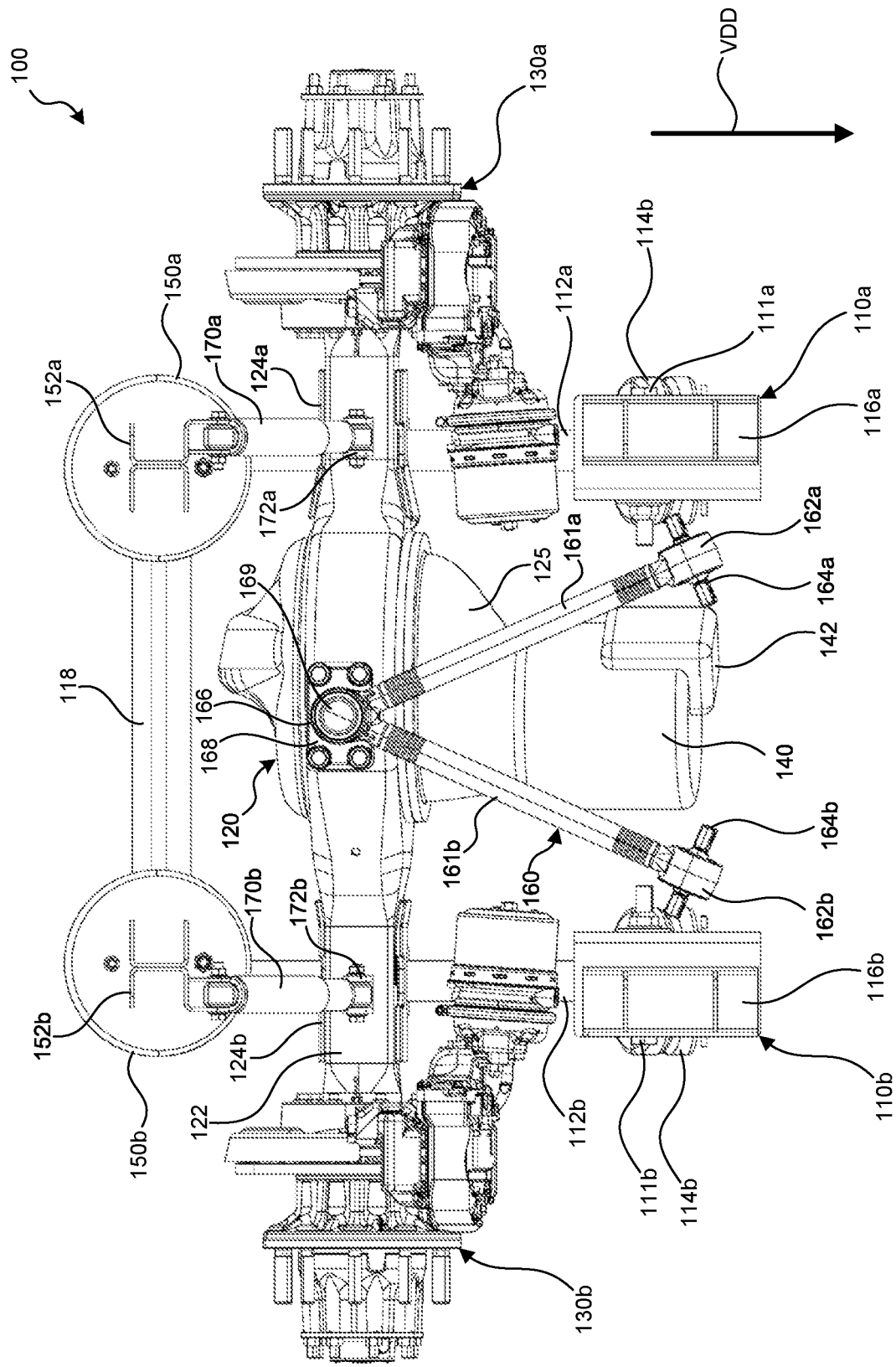

The following disclosure describes various embodiments of driven lift axles and associated systems and components for use on heavy duty trucks, trailers, and/or other vehicles. In some embodiments, driven lift axle systems configured in accordance with the present technology include one or more motors mounted to the lift axle to provide torque to drive the wheels of the lift axle. Various mounting configurations of such motors are possible in accordance with the present technology, such as arranging a motor on the axle to provide torque at a conventional driveshaft input, e.g., by interfacing with a differential drive gear. Other mounting configurations include positioning a motor at one or both of the wheel ends of the axle to provide torque directly to the wheels. In embodiments with a motor at each of the wheel ends, each wheel can be driven by a separate motor, additionally allowing for independent control of the torque applied to each wheel. The embodiments described herein are suitable for use with various types of motors capable of applying torque to the axle and/or wheels, such as electric motors, hydraulic motors, internal combustion engines, etc. The systems of the present technology are suitable for use on vehicles with or without separate or additional drive systems, e.g., internal combustion engines, transmissions, and drivelines.

Other configurations of driven lift axles are also within the scope of the present technology, such as twin steer suspension configurations in which two axles positioned at the front of the vehicle are steerable and one or both axles are independently driven and liftable. Using the driven lift axle systems described herein, one of the twin steer axles can be lifted under light loads while maintaining the option to lower the lifted axle and provide power under heavy loads. Rail service vehicles may also use embodiments of the driven lift axle systems of the present technology to raise the road engaging axles and engage the rail rollers. Vehicles that use outriggers for stabilization may have configurations of the driven lift axle systems that allow all the axles to be raised (lowering the chassis) such that the outriggers support the weight and stabilize the vehicle rather than lift the chassis to provide stabilization. Other configurations are also within the scope of the present technology.

Conventional lift axles cannot feasibly be driven by a driveline from a conventional vehicle engine. Conventional driveline configurations that transfer power from the engine to the transmission to the rear axles typically require rotating coupling joints (e.g., universal joints) that are capable of transferring torque at a range of pinion angles between the driveline and the input of the differential. Those of ordinary skill in the art will understand that the term "differential," as used herein, can refer to assemblies of gears, friction discs, or the like that are configured to transfer input torque (e.g., from a driveline, a motor shaft, etc.) generally laterally (e.g., 90°) from the input direction and to an axle shaft (e.g., a solid axle shaft, split/half shafts, etc.). Any differentials may be suitable for use with the embodiments described herein, such as open differentials, limited slip differentials, clutch-type differentials, etc. Such driveline to differential rotating coupling joints are configured to transfer torque at different pinion angles as the suspension allows the axle to move up and down relative to the vehicle chassis during use. In lift axle systems, the lift axle must be able to travel through an operating range that is considerably longer than non-lift axles in order to raise the lift axle wheels completely off the ground and provide sufficient clearance of the lift axle wheels to the ground when lifted. For example, a typical lift axle rated for 13,500 pounds can be configured to move approximately up to nine inches between the ride height (i.e., the position of the suspension relative to the vehicle chassis when the vehicle is at rest and the lift axle is in the lowered position) and the lifted or raised position. By way of comparison, the distance between the ride height and the maximum compressed state of a non-lift axle suspension of similar size would typically be about three to four inches. As a result, the pinion angles required when the lift axle is raised would be beyond the capabilities of conventional driveline joints. Further, if a conventional driveline were used in a pusher lift axle configuration, the non-liftable drive axle rearward of the lift axle would presumably have to include an articulating driveline spanning from the lift axle to the drive axle (i.e., the third, rearmost axle in a 6×4 configuration) so that power from the vehicle engine would drive both the lift axle and the drive axle. Without such an interaxle driveline, the non-lift axle would not be driven and the benefits of a 6×2 liftable configuration would not be realized. Embodiments of the present technology overcome these problems by directly driving the wheels of the lift axle.

Since conventional lift axles are not driven, the suspension systems for the lift axles do not require control rods operably coupled between the lift axle and the frame of the vehicle for reducing torque effects on the suspension caused by the drive system input torque. Such control rods that are operably coupled between the lift axle and the vehicle frame along the longitudinal axis of the vehicle are commonly referred to as "torque rods," and control rods operably coupled between the lift axle and the vehicle frame along the lateral axis of the vehicle are commonly referred to as "panhard rods." Torque rods generally prevent excessive rotation of the axle about an axis parallel to the lift axle (the lateral axis of the vehicle) during application of torque to the wheels (drive or braking torque), while panhard rods generally increase the lateral stiffness of the suspension during application of torque to the axle by the drive system (driveline input torque) by preventing excessive rotation of the axle about the longitudinal axis of the vehicle. Some control rod configurations combine the stabilizing effects of both the torque rods and panhard rods into a single rod assembly commonly referred to as a "v-rod," which contributes to both the longitudinal and lateral control of the lift axle relative to the frame.

Certain details are set forth in the following description and in FIGS. 1A-4 to provide a thorough understanding of various embodiments of the present technology. In other instances, well-known structures, systems, materials and/or operations often associated with lift axles and associated components, electric and hydraulic motors, heavy duty trucks and other vehicles, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present disclosure. Those of ordinary skill in the art will also appreciate that further embodiments of the invention can be practiced without several of the details described below. In the Figures, identical reference numbers identify identical, or at least generally similar, elements.

FIG. 1A is a left side (driver side) view of a vehicle 10 having a lift axle system 22 (e.g., a driven lift axle system as described below with reference to FIGS. 1B-4), configured in accordance with embodiments of the present technology. The vehicle 10 includes a cab 18 mounted to a chassis 12. The chassis 12 has two laterally spaced-apart, longitudinally extending frame members 14 at a position above a ground surface 20, although only one frame member 14 can be seen in the side view of FIG. 1. The vehicle 10 includes non-liftable tandem axles 16a and 16b, of which one or both of the tandem axles 16a and 16b can be drive axles. In some embodiments, only a single drive axle can be used with the driven lift axle systems of the present technology. Alternatively, any number of drive and lift axles are within the scope of the present disclosure. The lift axle assembly 22 can include one or more wheels 24 rotatably mounted on opposite sides thereof. In operation, a lift axle can raise wheels of the lift axle off of the ground when the additional support of the lift axle is not needed (e.g., for tighter maneuvering, lighter loading configurations, etc.), and lower wheels into contact with the ground as shown in FIG. 1 when the extra support of the lift axle is needed or desired (e.g., for bridge laws, heavier loading configurations, etc.).

The lift axle system 22 can be attached to the frame members 14 ahead or behind the tandem axles 16a and 16b (e.g., in a pusher or tag configuration, respectively). In other embodiments, the lift axle system 22 can be positioned to replace either or both of the non-liftable tandem axles 16a and 16b (e.g., a lift axle system 22 positioned forward of the non-liftable axle 16b and replacing the non-liftable axle 16a, a lift axle system 22 positioned rearward of the non-liftable axle 16a and replacing the non-liftable axle 16b, or two lift axle systems 22 in tandem positioning replacing both the non-liftable axles 16a and 16b). In other configurations, any number of additional non-driven or driven pusher or tag axles can be used with the non-liftable axles 16a and 16b and the lift axle system 22. In vehicles with a 6×4 configuration, one or both of the driven axles in the tandem rear position can be embodiments of the driven lift axle systems described herein with reference to FIGS. 1B-4. In these tandem driven lift axle system embodiments, the operator and/or vehicle system can decide which of the two driven lift axles is raised based on any suitable parameter. For example, with the forward axle in the tandem raised, weight on the rear tandem axle is increased and thereby traction at the rear tandem tires is increased. This configuration can be beneficial to prevent situations where the vehicle may not be able to start movement from a stopped position. Conversely, when the rear axle in the tandem raised, the wheelbase of the vehicle is shortened which results in a tighter turning radius, generally improving slow speed maneuverability.

For directional reference in the discussion that follows, it will be understood that the vehicle 10 is pointed in a vehicle drive direction VDD and is aligned with a longitudinal axis L. Additionally, it will be understood that a vertical axis V extends upwardly at a right angle to the longitudinal axis L, and that a lateral axis (not shown) of the vehicle extends horizontally transverse to the longitudinal axis L. Although the vehicle 10 is depicted as a concrete mixer with a tandem axle and tag liftable axle for purposes of illustration, the driven lift axle systems described herein can be used with virtually any type of heavy-duty vehicle including, for example, other types of trucks, trailers, etc., with the lift axle in either a tag and pusher configuration, and with both steerable and non-steerable lift axles. Accordingly, the various embodiments of the present technology described herein are not limited to use with any particular type of vehicle or in any particular type of axle arrangement unless specifically noted otherwise herein.

FIGS. 1B-1E are perspective, top plan, right side, and exploded perspective views, respectively, of a driven lift axle system 100 ("system 100") configured in accordance with embodiments of the present technology. In operation, the system 100 can be moved between a lowered position (deployed or active) and a raised position (stowed or inactive). A number of conventional components typically found on lift axle systems, including, e.g., wheels, hardware brackets, lines, and/or wiring, etc. and components of the truck or tractor chassis (e.g., the frame rails) have been omitted from some of the Figures herein for purposes of clarity. Further, the following description may describe components on only one side of the illustrated lift axle systems for purposes of clarity (e.g., the components on left-hand side of the vehicle). It will be appreciated that although only components on one side of the system 100 may be described herein, the opposite side of the system 100 includes a mirror image arrangement of the same or mirrored components, where applicable.

Referring to FIGS. 1B-1E together, the system 100 includes front hanger bracket assemblies 110a and 110b having upper frame brackets 116a and 116b, respectively, configured to be attached to two spaced apart, longitudinally extending vehicle frame rails (not shown) in a conventional manner. The system 100 further includes trailing arms 112a and 112b having forward end portions pivotally coupled at pivot pins 111a and 111b (e.g., bolts through bushings (not shown), see FIGS. 1C and 1D) to the front hanger bracket assemblies 110a and 110b, respectively, where the pivoting coupling permits movement of the system 100 as it moves between the lowered and raised positions, as well as permitting movement during suspension articulation while the vehicle is driving with the wheels of the lift axle in contact with the ground. To control the transition of the system 100 between the lowered and raised positions, the lift axle 100 further includes air springs 114a and 114b (referred to herein as "lift springs 114a and 114b") that are operably coupled between the front hanger bracket assemblies 110a and 110b and the trailing arms 112a and 112b, each respectively.

The system 100 further includes air springs 150a and 150b (referred to herein as "load springs 150a and 150b") that operably extend between aft end portions of the trailing arms 112a and 112b and rear frame brackets 152a and 152b positioned atop the load springs 150a and 150b. The rear frame brackets 152a and 152b are configured to fixedly attach upper end portions of the load springs 150a and 150b to their respective frame rail in a conventional manner. Inflation of the load springs 150a and 150b with air or other gas generally causes extension of the load spring body and corresponding separation between the aft portion of the trailing arms 112a and 112b and the rear frame brackets 152a and 152b, respectively. The system 100 can include a crossbar 118 to operably couple the aft portion of the trailing arms 112a and 112b together. The crossbar 118 can prevent excessive torsion on the pivot pins 111a and 111b of the trailing arms 112a and 112b due to off-center loads of the load springs 150a and 150b. The crossbar 118 is further configured to stabilize the pivoting motion of the trailing arms 112a and 112b such that the left and right sides of the system 100 have synchronized articulation, have both wheels lift simultaneously, increase roll stiffness to improve cornering stability of the vehicle, etc.

During use of the system 100, deflation of the lift springs 114a and 114b with corresponding inflation of the load springs 150a and 150b (together the "lifting system") causes the trailing arms 112a and 112b to respectively rotate downwardly about the pivot pins 111a and 111b at the hanger bracket assemblies 110a and 110b and toward the lowered position. The pivoting movement of the trailing arms 112a and 112b causes the wheels (not shown, see, e.g., the wheels 24 of FIG. 1) of the system 100 contact the ground. Similarly, inflation of the lift springs 114a and 114b with corresponding deflation of the load springs 150a and 150b causes the trailing arms 112a and 112b to respectively rotate upwardly about the pivot pins 111a and 111b at the hanger bracket assemblies 110a and 110b and toward the raised position. In this regard, the load springs 150a and 150b compress and the wheels of the system 100 raise, disengaging the wheels from the ground. Examples of air springs are disclosed in International PCT Publication No. WO 2006/071172 of Terborn, et al, and in U.S. Pat. No. 4,934,667 to Pees, et al, which are also incorporated herein by reference in their entireties.

Figure 1D:
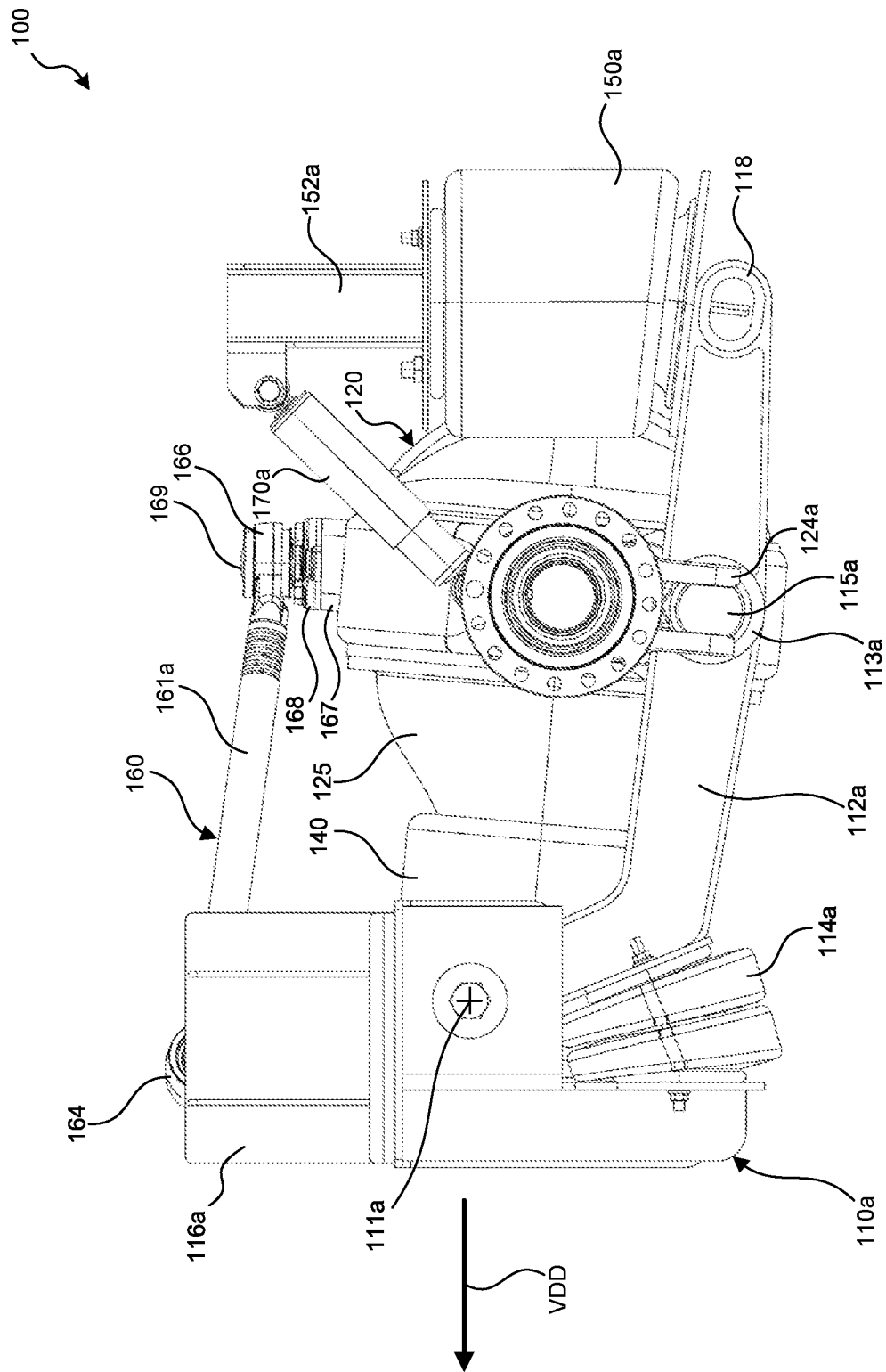
Figure 1E:
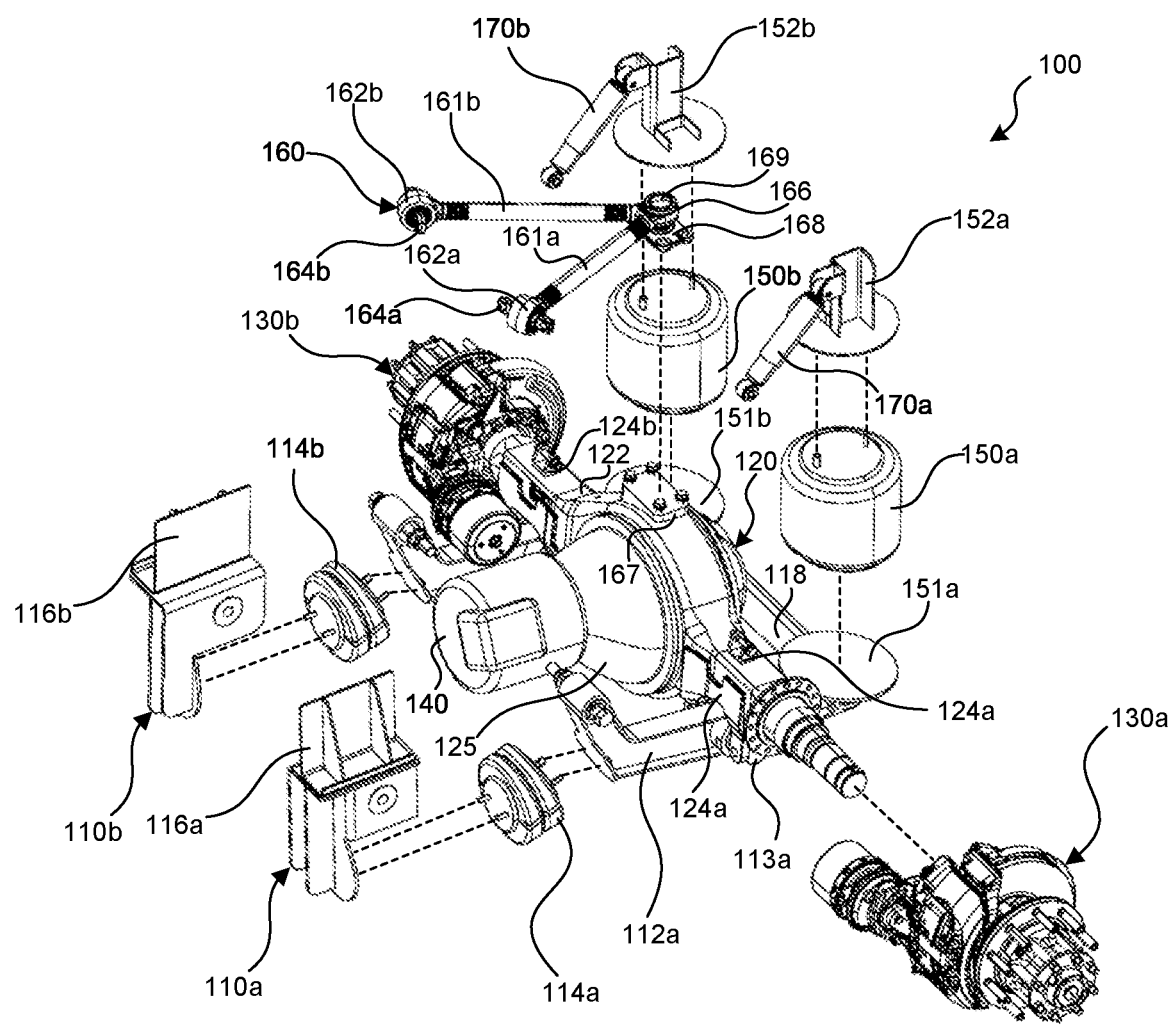

The system 100 further includes an axle assembly 120 having an axle housing 122 operably coupled to and carried by the trailing arms 112a and 112b. As shown in FIG. 1D, a medial portion of the trailing arm 112a can include a retaining feature 113a for receiving a trailing arm bushing 115a to operably couple the trailing arm 112a to bracket 124a that is operably coupled to the axle assembly 120. Similarly, a medial portion of the trailing arm 112b can be operably coupled to the axle assembly 120 by a bracket 124b (see FIG. 1B). The bracket 124a can be operably coupled to the axle housing 122 by welding (e.g., a weldment), an integrated component, fasteners, or the like, and can include suitable features for operably coupling the trailing arm 112a. In some embodiments, the axle housing 122 includes a differential cover 125 for protecting the internal components of the axle assembly 120 from damage. The axle assembly 120 includes wheel end assemblies 130a and 130b positioned at each outer end of the axle housing 122. The internal components of the axle housing 122 are not shown for purposes of clarity (e.g., a differential, axle shafts, bearings, gears, and other components to direct input torque to the wheel end assemblies 130a and 130b). A number of conventional components normally found on wheel end assemblies have not been labeled or individually identified herein for purposes of clarity (e.g., brake calipers, brake discs, wheel bearings, hubs, etc.). The system 100 may further include components for controlling the ride of the system 100 during use, such as shock absorbers 170a and 170b (e.g., conventional hydraulic shock absorbers), that operably extend between the rear frame brackets 152a and 152b at a first end and the axle housing 122 at a second end, at which the shock absorbers 170a and 170b are operably coupled with shock absorber brackets 172a and 172b that are coupled to the axle housing 122 e.g., by welding (a weldment), fasteners, or the like. In other embodiments, the shock absorbers can operably extend between other components of the system 100, e.g., the trailing arms 112a and 112b and the frame rails, or other suitable components to provide damping to the system 100 during articulation of the suspension.

In some embodiments, the load springs 150a and 150b can be pneumatically coupled to the lift springs 114a and 114b, respectively, to facilitate damping of the non-drive lift axle, e.g., the auxiliary suspension air damping systems described in U.S. Pat. No. 10,543,730, filed Feb. 6, 2018, and titled AUXILIARY SUSPENSION AIR DAMPING SYSTEMS AND ASSOCIATED METHODS OF MANUFACTURE AND USE, which is incorporated herein by reference in its entirety. In these embodiments, the shock absorber brackets 172a and 172b can additionally provide damping or may be omitted in favor of the damping provided by the pneumatic coupling of the load springs 150a and 150b and the lift springs 114a and 114b.

The system 100 can further include a motor 140 configured to drive the wheel end assemblies 130a and 130b. In some embodiments, the motor 140 can be operably coupled to the axle housing 122 at the differential cover 125 and configured to provide torque to an input component (e.g., a gear, shaft, etc., not shown) of the axle assembly 120. In some embodiments, an output shaft (not shown) of the motor 140 can be operably coupled to a differential drive gear (not shown) contained within the axle housing 122 and differential cover 125 to provide torque to the axle wheels via an axle shaft (also not shown) at least partially contained within the axle housing 122 of the axle assembly 120. The axle assembly 120 can be configured for use with the lift axle 100 and include a variety of differential types and gear ratios dependent on the intended use and the specified equipment of the vehicle. Further embodiments of the driven lift axle systems described herein are suitable for use with axle assemblies having steerable wheels disposed on the outer ends of the axle.

The motor 140 can be an electric motor, a hydraulic motor, a pneumatic motor, an internal combustion engine, and/or other suitable motor configured to provide torque to the wheels of the axle assembly 120. In embodiments having an electric motor, the motor 140 may receive electric power at a power connection portion 142 from any suitable power source. In a vehicle having electric drive motors powering one or more drive axles, the same battery bank providing electric power to the electric motors of the drive axles can be configured to additionally power to the motor 140 of the system 100. Alternatively, in a vehicle having an internal combustion engine powering one or more drive axles, an auxiliary power system (e.g., an auxiliary battery bank with higher voltage components) may be necessary to provide power to the motor 140 of the system 100. In embodiments in which the motor 140 is a hydraulic motor, the motor 140 may receive hydraulic power from any suitable power source, e.g., one or more hydraulic pumps fluidly coupled to storage tanks and the motor 140 with hydraulic lines, etc. In any of these embodiments, the power to the motor 140 may be controlled manually (e.g., by the operator), automatically (e.g., by the vehicle control system and/or the engine control unit (ECU) of the vehicle), or any combination thereof, and may be reactive to one or more road conditions (e.g., by sensing a loss of traction, by a fuel economy optimization program, by driver selectable parameters, etc.). For example, the power to the motor 140 can be disabled (automatically or manually) when the system 100 is in the stowed position (raised), the system 100 may be raised or lowered in reaction to evasive maneuvers of the vehicle, etc. With any of the configurations of the present technology, a regenerative braking system may be integrated into the system 100 to provide regenerative power to the electrical system of the vehicle and/or an auxiliary power system of the motor 140 during coasting and/or braking.

In some embodiments, the axle assembly 120 and the motor 140 can be at least generally similar in structure and function to the corresponding components of the SPICER® Electrified eS20D e-Axle having TM4 electric motor technology provided by Dana Limited at 3939 Technology Drive, Maumee, OH 43537; or the AXE ELECTRIC AXLE SERIES™ integrated electric axle provided by Allison Transmissions, Inc. at One Allison Way, Indianapolis, IN 46222. In other embodiments, the motor 140 is a hydraulic motor that can be at least generally similar in structure and function to the MD11 Hydraulic Motor provided by Poclain Hydraulics Inc. at 1300 N. Grandview Parkway, Sturtevant, WI 53117; or the Black Bruin B200 On-Demand Wheel Motors provided by Black Bruin Inc. Valmetintie 9, FI-40420 Jyska, Finland. However, further embodiments of the system 100 may include any suitable axle assembly 120 and/or motor 140 to provide torque to the system 100. An air kit used with the system 100 (e.g., to control the lift and load springs, the brakes, etc.) may be any typical air control kit for use with lift axles, such as the STANDARD AIR CONTROL KIT, Part No. 13501004, provided by Link Manufacturing, Ltd, Sioux Center, IA 51250.

The system 100 further includes a control rod assembly 160, illustrated in a "v-rod" configuration, that is operably coupled between the axle housing 122 and the frame of the vehicle. The control rod assembly 160 includes rod portions 161a and 161b extending in a "V" shape having frame coupling ends 162a and 162b with bushings 164a and 164b, respectively, at the open ends of the "V," and an axle coupling end 166 with a bushing 169 at the point end of the "V." The frame coupling ends 162a and 162b of the control rod assembly 160 can be operably coupled through the bushings 164a and 164b, respectively, to the frame rails with any suitable connection, e.g., a bracket, a cross member, etc. The axle coupling end 166 of the control rod assembly 160 can be operably coupled through the bushing 169 to the axle housing 122 by a bracket 168 that is operably coupled to a mounting protrusion 167 on the axle housing 122 by, e.g., welding (a weldment), fasteners (as shown in the illustrated embodiment), or the like. The control rod assembly 160 is configured to prevent excessive motion of the axle assembly 120 in both the longitudinal and lateral directions relative to the frame of the vehicle during torque application by the wheels (which can cause longitudinal rotation of the axle assembly 120) and torque application by the motor 140 (which can cause lateral rotation of the axle assembly 120). The bushings 164a, 164b, and 169 provide limited movement in both the longitudinal and lateral directions relative to the frame of the vehicle as to limit the stress on components of the system 100 and provide smoother operation during torque application by the motor 140 and/or the wheels. In other embodiments, any suitable joint can be used at the coupling ends 162a, 162b, and 166, such as spherical joints, solid joints, etc.

Figure 2:
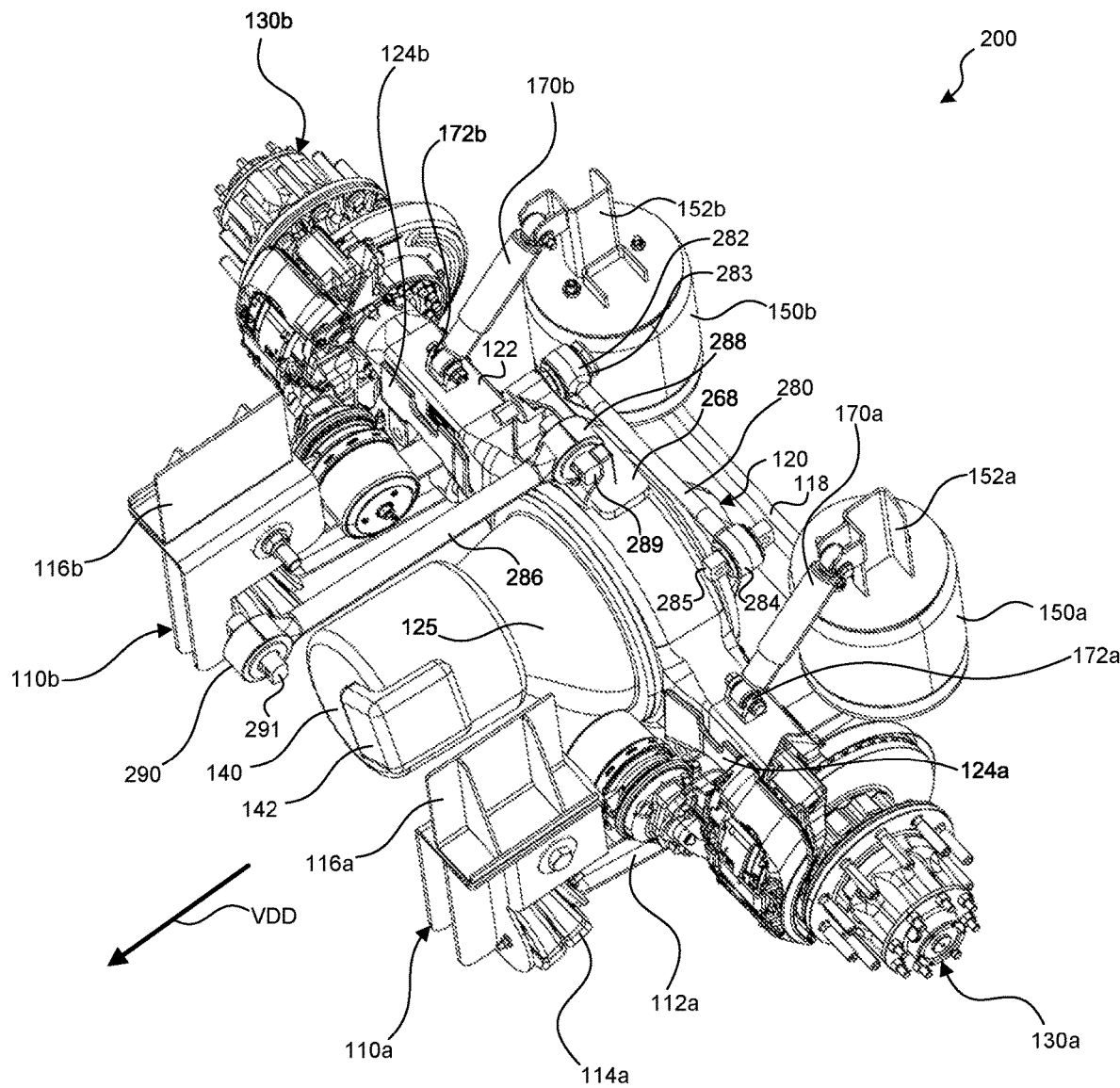
FIG. 2-4 are perspective views of driven lift axle systems configured in accordance with further embodiments of the present technology.

FIG. 2 is a perspective view of a driven lift axle system 200 ("system 200") configured in accordance with other embodiments of the present technology. The system 200 is similar in structure, component configuration, and function as the system 100 describe above, except for components related to the control rods of the system 200. Instead of having a "v-rod" configuration as shown in the illustrated embodiment of the system 100, the system 200 includes a first control rod 280 (e.g., a "panhard rod 280") and a second control rod 286 (e.g., a "torque rod 286"). The panhard rod 280 operably extends laterally between the axle assembly 120 and the frame of the vehicle. The panhard rod 280 has an axle coupling end 282 with a bushing 283, and a frame coupling end 284 with a bushing 285. The frame coupling end 284 of the panhard rod 280 can be operably coupled through the bushing 285 to the frame rails with any suitable connection, e.g., a bracket, a cross member, etc. The axle coupling end 282 of the panhard rod 280 can be operably coupled through the bushing 283 to the axle housing 122 by a bracket 268 that is operably coupled to the axle housing 122 by, e.g., welding (a weldment), fasteners, or the like. The torque rod 286 operably extends longitudinally between the axle assembly 120 and the frame of the vehicle. The torque rod 286 has an axle coupling end 288 with a bushing 289, and a frame coupling end 290 with a bushing 291. The frame coupling end 290 of the torque rod 286 can be operably coupled (via, e.g., bolts extending through the bushing 291) to the frame rails with any suitable connection, e.g., a bracket, a cross member, etc. The axle coupling end 288 of the torque rod 286 can be operably coupled (via, e.g., bolts extending through the bushing 289) to the axle housing 122 by the bracket 268. In the illustrated embodiment, both of the axle coupling ends 282 and 288 are operably coupled to the axle assembly 120 by a single bracket 268; however, in other embodiments, each of the axle coupling ends 282 and 288 can be operably coupled to the axle assembly by separate brackets, weldments, or any other suitable component.

Figure 3:
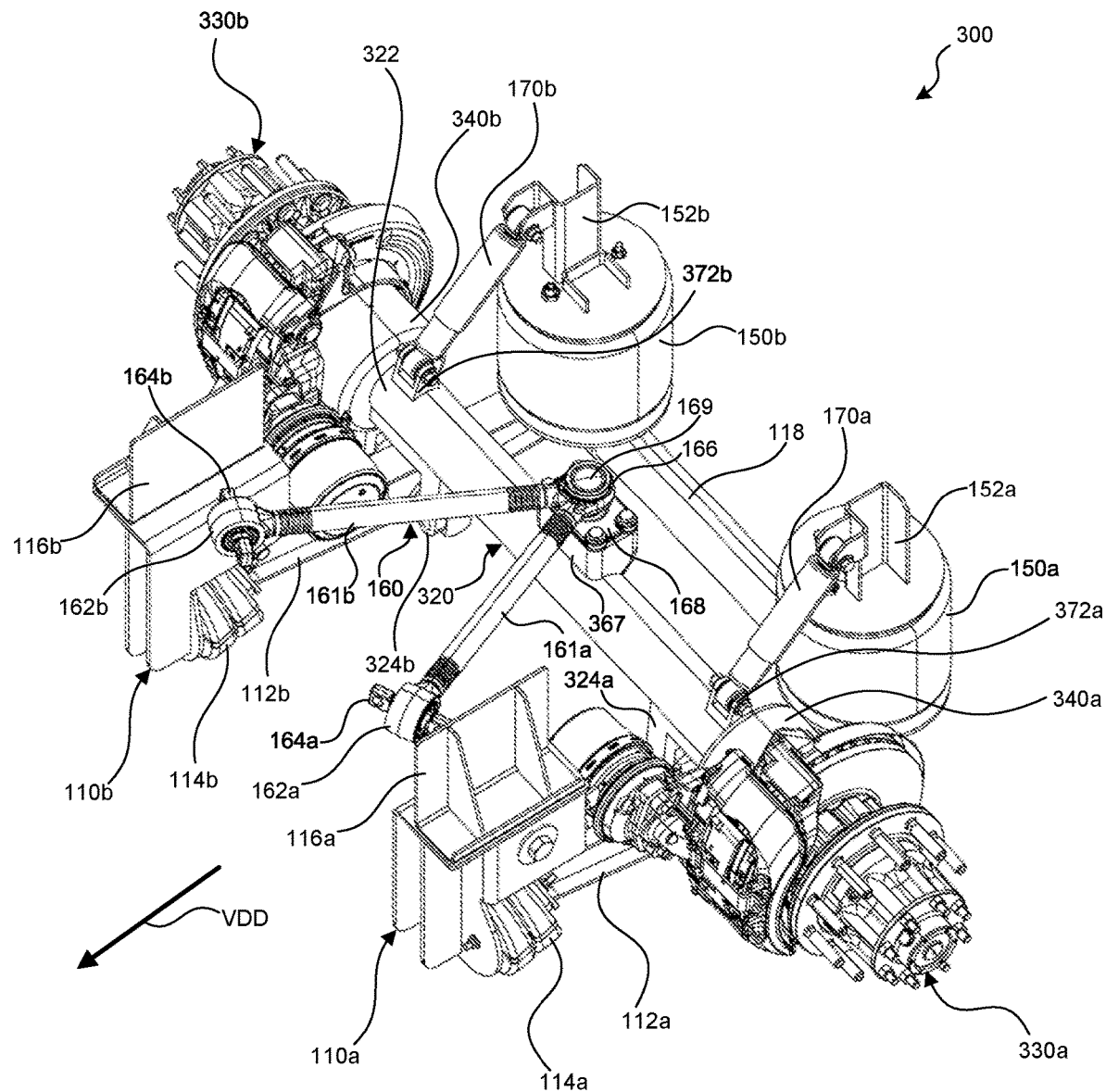
Figure 4:
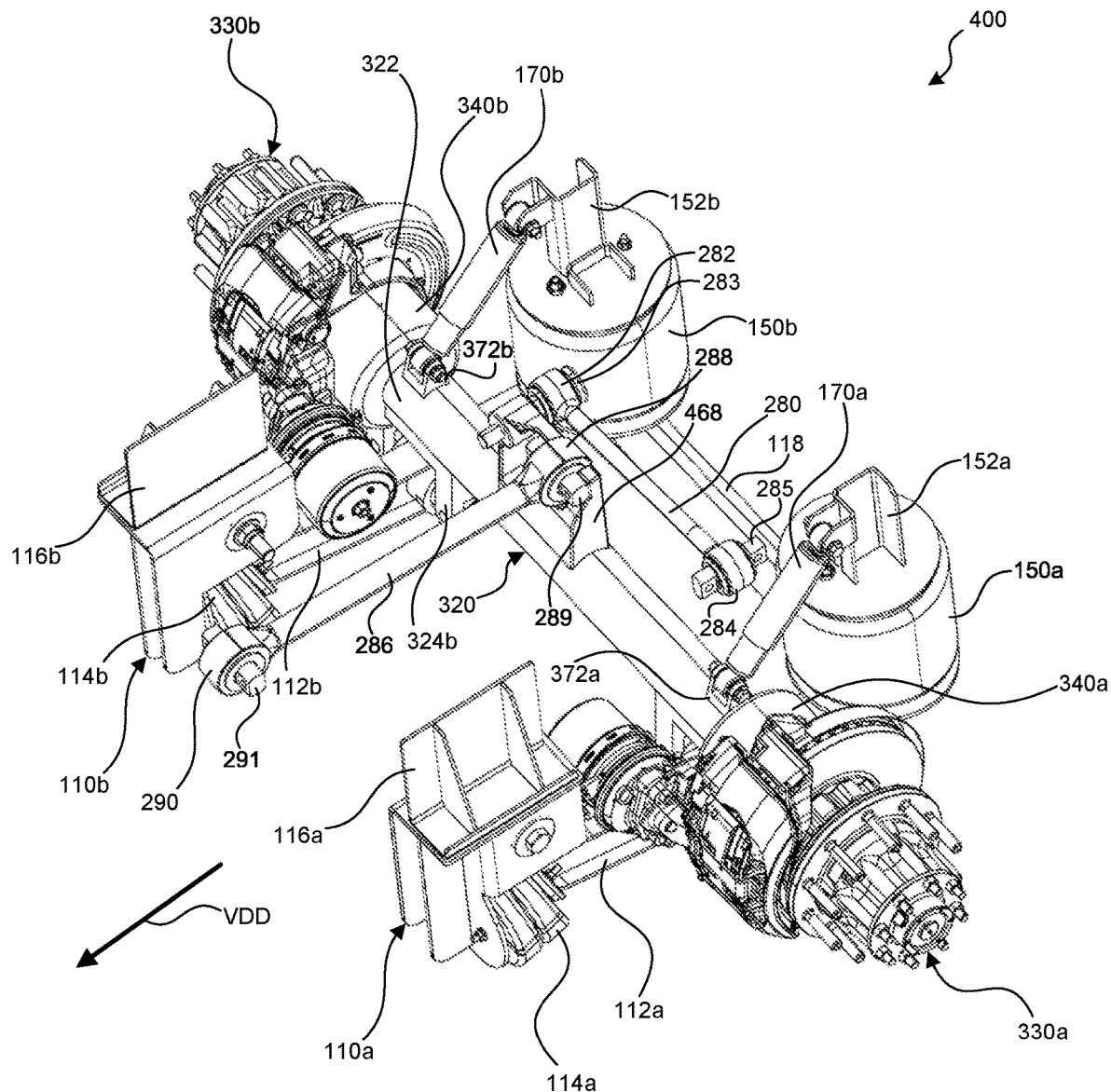

FIGS. 3 and 4 are perspective views of driven lift axle systems 300 ("system 300") and 400 ("system 400"), respectively, configured in accordance with further embodiments of the present technology. Certain components of the system 300 are similar in structure, component configuration, and function as the system 100 described above, except for components denoted by reference numbers in the 300-series. Certain components of the system 400 are similar in structure, component configuration, and function as the systems 200 and 300 described above except for components denoted by reference numbers in the 400-series.

Referring first to FIG. 3, the system 300 includes an axle assembly 320 having an axle housing 322 (e.g., a beam) extending between the trailing arms 112a and 112b. The axle housing 322 can be operably coupled to the trailing arms 112a and 112b by brackets 324a and 324b configured to operably couple to the axle housing 322 by welding (e.g., a weldment), an integrated component, fasteners, or the like, and can include suitable features for operably coupling to the trailing arms 112a and 112b, respectively. The axle assembly 320 differs from the axle assembly 120 of systems 100 and 200 by omitting the differential and centrally mounted motor 140, and instead including motors 340a and 340b positioned at the laterally outer ends of the axle housing 322. The motors 340a and 340b are operable to each drive wheel end assemblies 330a and 330b, respectively, positioned at the outer ends of the axle assembly 320. Since the motors 340a and 340b are configured to each operably drive the respective wheel end assemblies 330a and 330b, the axle housing 322 does not require a differential, gears, axle shafts, etc. positioned between the motors 340a and 340b. In some embodiments, other components of the system 300 can be included within the axle housing 322, such as wiring or lines for the motors 340a and 340b, electrical components (e.g., control systems), etc.

In some embodiments, the motors 340a and 340b are operable to independently provide torque to the respective wheel end assemblies 330a and 330b. In this regard, embodiments of the system 300 can include various control systems for traction control, ride quality, fuel economy, and the like. In these embodiments, the torque provided by the motors 340a and 340b can be at different levels, or one or both of the motors 340a and 340b can unenergized during use of the vehicle depending on traction and/or drive force requirements, system performance, electric power level, etc. Alternatively, in other embodiments a single motor (similar to motors 340a or 340b) can be configured to drive both of the wheels of the driven lift axle system. The motors 340a and 340b can be electric motors, hydraulic motors, and/or other suitable motors configured to provide torque to the wheels end assemblies 330a and 330b, respectively. In embodiments having one or more electric motors, the motors 340a and 340b may receive electric power from any suitable power source. In a vehicle having electric drive motors powering one or more drive axles, the same battery bank providing electric power to the electric motors of the drive axles can be configured to additionally power to the motors 340a and 340b. Alternatively, in a vehicle having an internal combustion engine powering one or more drive axles, an auxiliary power system (e.g., an auxiliary battery bank with higher voltage components) may be necessary to power to the motors 340a and 340b. In embodiments where the motors 340a and 340b are hydraulic motors, the motors 340a and 340b may receive hydraulic power from any suitable power source, e.g., one or more hydraulic pumps fluidly coupled to storage tanks and the motors 340a and 340b with hydraulic lines, etc. In any of these embodiments, the power to the motors 340a and 340b may be controlled manually (e.g., by the operator), automatically (e.g., by the vehicle control system and/or the engine control unit (ECU) of the vehicle), or any combination thereof, and may be reactive to one or more road conditions (e.g., by sensing a loss of traction, by a fuel economy optimization program, by driver selectable parameters, etc.). With any of the configurations of the present technology, a regenerative braking system may be integrated into the system 300 to provide regenerative power to the electrical system of the vehicle, and/or to an auxiliary power system of the motors 340a and 340b, during coasting and/or braking.

The system 300 includes the "v-rod" style control rod assembly 160 similar to the control rod configuration of the system 100. The control rod assembly 160 has the axle coupling end 166 with the bushing 169 that is operably coupled by the bracket 168 to a mounting protrusion 367 on the axle housing 322 by, e.g., welding (a weldment), fasteners (as shown in the illustrated embodiment), or the like. The mounting protrusion 367 can have a similar configuration to the mounting protrusion 167 of the system 100, but have a different size, shape, and/or attachment configuration for operably coupling to the axle housing 322.

Referring next to FIG. 4, the system 400 includes the axle assembly 320 similar to the system 300 with the motors 340a and 340b operable to each drive the wheel end assemblies 330a and 330b, respectively, positioned at the outer ends of the axle assembly 320. The system 400 differs from the system 300 in the control rod configuration. More specifically, the system 400 has a similar control rod configuration to the system 200—having the panhard rod 280 to control lateral rotation of the axle assembly 320, and the torque rod 286 to control longitudinal rotation of the axle assembly 320. The axle coupling end 282 of the panhard rod 280 can be operably coupled through the bushing 283 to the axle housing 322 by a bracket 468 that is operably coupled to the axle housing 322 by, e.g., welding (a weldment), fasteners, or the like. The axle coupling end 288 of the torque rod 286 can be operably coupled through the bushing 289 to the axle housing 322 by the bracket 468. In the illustrated embodiment, both of the axle coupling ends 282 and 288 are operably coupled to the axle assembly 320 by a single bracket 468; however, in other embodiments, each of the axle coupling ends 282 and 288 can be operably coupled to the axle assembly by separate brackets, weldments, or any other suitable component.

Although some embodiments of the driven lift axle systems described herein include motors mounted to the axle housing, the axle beam, and/or one or more of the wheel ends, other embodiments of the present technology disclosed herein can include one or more motors (e.g., electric motors) mounted to other portions of the driven lift axle system and/or other portions of the vehicle (e.g., the vehicle frame, vehicle suspension, etc.). For example, in some embodiments one or more motors can be mounted to a portion of the vehicle frame proximate and/or adjacent to the driven lift axle system, a crossmember of the frame, an auxiliary bracket, a transmission of the vehicle, any position on an axle beam (e.g., a medial portion, an end portion, etc.), a suspension component, etc. Accordingly, embodiments of the present technology disclosed herein are not limited to a particular location of the motor unless the context clearly requires otherwise.

In some embodiments, the electric wheel end motors 340a and 340b can be similar in structure and function to the motors used with the AxTrax AVE electric portal axle technology provided by ZF Friedrichshafen AG/ZF North America, Inc. at 15811 Centennial Drive, Northville, MI 48168. However, other embodiments of the systems 300 and 400 can include any suitable motor configuration to provide torque to the wheel end assemblies 330a and 330b of the systems 300 and 400.

Embodiments of lift axle systems configured in accordance with the present technology can provide several advantages over conventional truck and tractor configurations. For example: (1) vehicles with lower-powered engine specifications, such as vehicles with a 6×2 configuration, can receive additional power as needed by one or more motors of the driven lift axle; (2) the sensitivity of tractive performance of a 6×2 configuration to transmission, wheelbase, and other vehicle parameters can be reduced; (3) traction can be optimized, or at least improved, for various loading and road conditions; and/or (4) the lift axle can be configured to utilize automatic controls of the drive system to optimize vehicle performance parameters, including fuel economy and traction/stability control.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above.

While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system for use with a vehicle having a vehicle frame, the system comprising:
   an axle assembly having a differential operably coupled to an axle shaft, wherein the axle shaft is configured to be operably coupled to a wheel assembly;
   a motor operably coupled to the axle assembly and configured to provide torque to the differential to drive the wheel assembly; and
   a lifting system configured to be operably coupled to the vehicle frame and the axle assembly, wherein the lifting system is configured to move the axle assembly between a lowered position and a raised position.

2. The system of claim 1 wherein the lowered position is an engaged position in which the wheel assembly contacts a ground surface, and wherein the raised position is a disengaged position in which the wheel assembly is spaced apart from the ground surface.

3. The system of claim 1 wherein the axle assembly is a first axle assembly, and wherein the system further comprises a second axle assembly configured to be operably coupled to the vehicle frame adjacent to the first axle assembly, wherein the second axle assembly is a non-liftable axle assembly.

4. The system of claim 1 wherein the axle shaft is a first axle shaft and the wheel assembly is a first wheel assembly, and wherein the axle assembly further comprises a second axle shaft configured to be operably coupled to a second wheel assembly, and wherein the motor is configured to provide the torque to the differential to drive the first wheel assembly and the second wheel assembly.

5. The system of claim 1 wherein the motor is an electric motor.

6. The system of claim 5 wherein the electric motor is configured to be operably coupled to an electrical power source of the vehicle.

7. The system of claim 1, further comprising a control rod coupled to the axle assembly and configured to be coupled to the vehicle frame, wherein the control rod is configured to reduce rotation of the axle assembly about a lateral axis of the vehicle and/or rotation of the axle assembly about a longitudinal axis of the vehicle.

8. The system of claim 7 wherein the control rod is a torque rod configured to extend parallel to the longitudinal axis of the vehicle to reduce rotation of the axle assembly about the lateral axis.

9. The system of claim 8, further comprising a panhard rod coupled to the axle assembly and configured to be coupled to the vehicle frame, wherein the panhard rod extends parallel to the lateral axis of the vehicle.

10. The system of claim 7 wherein the control rod is a panhard rod, and wherein the panhard rod is configured to extend parallel to the lateral axis of the vehicle.

11. The system of claim 7 wherein:
    the control rod is a v-rod assembly having a first rod portion and a second rod portion;
    the first and second rod portions have separated first end portions configured to be operably coupled to the vehicle frame; and
    the first and second rod portions have joined second end portions operably coupled to the axle assembly.

12. A system for use with a vehicle having a vehicle frame, the system comprising:
    an axle assembly having a wheel hub operably positioned at an end portion of the axle assembly and a motor positioned to drive the wheel hub; and
    a lifting system configured to be operably coupled to the vehicle frame and the axle assembly, wherein the lifting system is configured to move the wheel hub between a lowered position and a raised position.

13. The system of claim 12 wherein the wheel hub is a first wheel hub operably positioned at a first end portion of the axle assembly, and further comprising a second wheel hub operably positioned at a second end portion of the axle assembly opposite the first end portion, wherein the motor is positioned to drive the first and second wheel hubs, and wherein the lifting system is configured to move the first and second wheel hubs between the lowered position and the raised position.

14. The system of claim 12 wherein the wheel hub is a first wheel hub operably positioned at a first end portion of the axle assembly, wherein the motor is a first motor, and wherein the system further comprises:
    a second wheel hub operably positioned at a second end portion of the axle assembly opposite the first end portion; and
    a second motor positioned to drive the second wheel hub, wherein the lifting system is configured to move the first and second wheel hubs between the lowered position and the raised position.

15. The system of claim 14 wherein the first motor is positioned proximate to the first end portion of the axle assembly, and wherein the second motor is positioned proximate to the second end portion of the axle assembly.

16. The system of claim 12 wherein the motor is an electric motor.

17. The system of claim 12 wherein the axle assembly is a first axle assembly, and wherein the system further comprises a second axle assembly configured to be operably coupled to the vehicle frame adjacent to the first axle assembly, wherein the second axle assembly is a non-liftable axle assembly.

18. A method of operating a lift axle assembly of a vehicle, the method comprising:
    with the lift axle assembly in a lowered position in which one or more wheels of the lift axle assembly contact a ground surface, driving the one or more wheel assemblies with one or more motors of the lift axle assembly; and
    moving the lift axle assembly from the lowered position to a raised position in which the one or more wheel assemblies are spaced apart from the ground surface.

19. The method of claim 18 wherein the motor is an electric motor, and wherein the method further comprises powering the electric motor with an electrical power source of the vehicle to drive the one or more wheel assemblies.

20. The method of claim 18 wherein the method further comprises automatically enabling the motor to drive the one or more wheel assemblies based on a road condition sensed by the vehicle.

* * * * *